(12) United States Patent
Liu et al.

(10) Patent No.: US 8,385,057 B2
(45) Date of Patent: Feb. 26, 2013

(54) FULLY EXTENDABLE DUAL-SEGMENTED HOUSING ASSEMBLY FOR MOBILE COMPUTING DEVICE

(75) Inventors: Eric Liu, Santa Clara, CA (US); Peter Skillman, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 12/796,541

(22) Filed: Jun. 8, 2010

(65) Prior Publication Data

US 2011/0299235 A1   Dec. 8, 2011

(51) Int. Cl.
*H05K 5/00* (2006.01)
*H05K 7/00* (2006.01)
*H05K 1/00* (2006.01)

(52) U.S. Cl. ......... 361/679.09; 361/679.04; 361/679.06; 361/679.55; 361/679.56; 455/575.1; 455/575.3; 455/575.4; 455/575.8

(58) Field of Classification Search ............. 361/679.01, 361/679.02, 679.08, 679.09, 679.3, 679.55–679.59; 174/535; 455/325, 556.1, 550.1, 90.1, 575.1
See application file for complete search history.

(56) References Cited

U.S. PATENT DOCUMENTS

| | | | |
|---|---|---|---|
| D95,851 S | 6/1935 | Lobl | |
| D243,535 S | 3/1977 | Ikeda | |
| D250,063 S | 10/1978 | Nishino et al. | |
| D259,201 S | 5/1981 | Sawada et al. | |
| D260,904 S | 9/1981 | Ikeda | |
| D266,855 S | 11/1982 | Yoshioka et al. | |
| D268,186 S | 3/1983 | Mandel et al. | |
| D280,217 S | 8/1985 | Tomozawa et al. | |
| D298,034 S | 10/1988 | Yoshiharu | |
| D299,136 S | 12/1988 | Taylor | |
| D302,274 S | 7/1989 | Fujita et al. | |
| D302,680 S | 8/1989 | Fujita et al. | |
| D315,691 S | 3/1991 | Morgan | |
| D318,069 S | 7/1991 | Cheung et al. | |
| D327,493 S | 6/1992 | Hayashi | |
| D330,907 S | 11/1992 | Burke | |
| D333,135 S | 2/1993 | Wachob et al. | |
| D337,569 S | 7/1993 | Kando | |
| D338,004 S | 8/1993 | Konno | |
| D344,523 S | 2/1994 | Kanno | |
| D346,793 S | 5/1994 | Iino et al. | |
| D346,797 S | 5/1994 | Tokiyama | |
| D349,511 S | 8/1994 | Sakaguchi et al. | |
| D354,478 S | 1/1995 | Miyahara | |
| D355,184 S | 2/1995 | Yokouchi | |

(Continued)

FOREIGN PATENT DOCUMENTS

| | | |
|---|---|---|
| KR | 10-2001-0055072 A | 7/2001 |
| WO | WO2007/047108 | 4/2007 |

OTHER PUBLICATIONS

U.S. Appl. No. 29/298,219, filed Nov. 30, 2007, Matsuoka.

(Continued)

*Primary Examiner* — Jayprakash N Gandhi
*Assistant Examiner* — Jerry Wu

(57) ABSTRACT

A mobile computing device formed from at least two housing segments that can be moved between positions, including an open position that fully exposes a display surface or façade of each of the housing segments, and a closed position in which at least one of the facades or display surfaces is occluded or overlaid by the other housing segment, according to at least some embodiments.

14 Claims, 15 Drawing Sheets

U.S. PATENT DOCUMENTS

| | | |
|---|---|---|
| D356,546 S | 3/1995 | Peart |
| D357,000 S | 4/1995 | Takahashi |
| D357,024 S | 4/1995 | Tokiyama et al. |
| D361,996 S | 9/1995 | Roegner |
| D362,266 S | 9/1995 | Matsuda |
| D365,558 S | 12/1995 | Kajita et al. |
| D366,463 S | 1/1996 | Ive et al. |
| D372,932 S | 8/1996 | Tamura et al. |
| 5,555,157 A | 9/1996 | Moller et al. |
| 5,596,350 A | 1/1997 | Capps et al. |
| D379,983 S | 6/1997 | Shindou |
| D380,750 S | 7/1997 | Sato et al. |
| 5,657,459 A | 8/1997 | Yanagisawa et al. |
| 5,682,558 A | 10/1997 | Kirigaya et al. |
| D389,465 S | 1/1998 | Heiman et al. |
| D389,828 S | 1/1998 | Kutsuzawa |
| D396,039 S | 7/1998 | Park |
| D396,215 S | 7/1998 | Inukai |
| D397,679 S | 9/1998 | Hawkins et al. |
| D398,904 S | 9/1998 | Tamaki et al. |
| D406,132 S | 2/1999 | Skrypalle |
| D406,133 S | 2/1999 | Hackbarth |
| D408,021 S | 4/1999 | Haitani et al. |
| D408,372 S | 4/1999 | Ota et al. |
| D415,122 S | 10/1999 | Monnig |
| D416,001 S | 11/1999 | Tal et al. |
| D419,588 S | 1/2000 | Chan |
| D423,468 S | 4/2000 | Jenkins |
| D426,236 S | 6/2000 | Kim et al. |
| D428,414 S | 7/2000 | Okumura |
| D430,127 S | 8/2000 | Collins et al. |
| 6,115,248 A | 9/2000 | Canova et al. |
| D432,535 S | 10/2000 | Loh et al. |
| D433,016 S | 10/2000 | Matsuda et al. |
| D433,409 S | 11/2000 | Chen |
| D434,034 S | 11/2000 | Burke et al. |
| D436,591 S | 1/2001 | Abston et al. |
| D436,592 S | 1/2001 | Okumura |
| D436,963 S | 1/2001 | Kim et al. |
| D437,301 S | 2/2001 | Meyer |
| D438,854 S | 3/2001 | Badoual |
| D441,733 S | 5/2001 | Do et al. |
| D442,156 S | 5/2001 | Lee |
| D442,157 S | 5/2001 | Muenscher et al. |
| 6,239,968 B1 | 5/2001 | Kim et al. |
| D447,126 S | 8/2001 | Carvalho |
| D448,012 S | 9/2001 | Matsuoka |
| D448,757 S | 10/2001 | Okubo |
| D450,313 S | 11/2001 | Koinuma |
| 6,351,640 B1 | 2/2002 | DeMont |
| D456,288 S | 4/2002 | Arispuro |
| 6,388,877 B1 | 5/2002 | Canova et al. |
| D460,448 S | 7/2002 | Matsumoto |
| D461,185 S | 8/2002 | Ando |
| D462,085 S | 8/2002 | Chan |
| D463,402 S | 9/2002 | Bohne |
| D466,096 S | 11/2002 | Takada |
| D469,762 S | 2/2003 | Iwama et al. |
| D470,854 S | 2/2003 | Jones et al. |
| D472,225 S | 3/2003 | Griffin |
| D476,328 S | 6/2003 | Miao et al. |
| D476,329 S | 6/2003 | Miao et al. |
| D476,985 S | 7/2003 | Griffin |
| D478,559 S | 8/2003 | Lee et al. |
| D479,233 S | 9/2003 | Griffin |
| D479,234 S | 9/2003 | Tanaka et al. |
| D481,711 S | 11/2003 | Vuolteenaho |
| D481,717 S | 11/2003 | Lewis et al. |
| D482,682 S | 11/2003 | Lehtonen |
| 6,647,248 B1 | 11/2003 | Ortscheid et al. |
| D483,359 S | 12/2003 | Lin et al. |
| D485,267 S | 1/2004 | Chien |
| D489,062 S | 4/2004 | Hong |
| D489,063 S | 4/2004 | Chiu et al. |
| D490,068 S | 5/2004 | Chen |
| D490,100 S | 5/2004 | Su et al. |
| D490,119 S | 5/2004 | Griffin et al. |
| D491,158 S | 6/2004 | Mou et al. |
| D493,440 S | 7/2004 | Chou et al. |
| D493,451 S | 7/2004 | Wada |
| 6,785,395 B1 | 8/2004 | Arneson et al. |
| D495,695 S | 9/2004 | Yugaya |
| D496,659 S | 9/2004 | Chien |
| D497,161 S | 10/2004 | Chien |
| D497,907 S | 11/2004 | Griffin |
| D499,401 S | 12/2004 | Miller |
| D500,028 S | 12/2004 | Hoehn et al. |
| D501,475 S | 2/2005 | Kim |
| D503,163 S | 3/2005 | Chan et al. |
| D506,754 S | 6/2005 | Schlieffers et al. |
| D508,046 S | 8/2005 | Suzuki |
| D509,500 S | 9/2005 | Watanabe et al. |
| 6,950,516 B2 | 9/2005 | Pirila et al. |
| D511,771 S | 11/2005 | Burns et al. |
| D513,749 S | 1/2006 | Schlieffers et al. |
| D515,058 S | 2/2006 | Boyd |
| 7,016,182 B2 | 3/2006 | Brandenberg et al. |
| D518,820 S | 4/2006 | Hawkins et al. |
| D518,821 S | 4/2006 | Hawkins et al. |
| D519,502 S | 4/2006 | Hawkins et al. |
| D521,015 S | 5/2006 | Hayes et al. |
| D522,484 S | 6/2006 | Griffin |
| D522,486 S | 6/2006 | Corley et al. |
| D523,837 S | 6/2006 | Lee |
| 7,061,762 B2 | 6/2006 | Canova et al. |
| D524,275 S | 7/2006 | Shin |
| D525,222 S | 7/2006 | Corley et al. |
| D525,223 S | 7/2006 | Griffin |
| D528,098 S | 9/2006 | Corley et al. |
| D528,532 S | 9/2006 | Dimitriadis et al. |
| D528,542 S | 9/2006 | Luminosu et al. |
| D529,044 S | 9/2006 | Andre et al. |
| 7,102,620 B2 | 9/2006 | Harries et al. |
| D529,488 S | 10/2006 | Uchida |
| 7,181,256 B2 | 2/2007 | Hyun et al. |
| D539,814 S | 4/2007 | Andre et al. |
| D548,218 S | 8/2007 | Hong et al. |
| D548,247 S | 8/2007 | Lee |
| D548,732 S | 8/2007 | Cebe et al. |
| D551,215 S | 9/2007 | Lee, Jr. et al. |
| D557,246 S | 12/2007 | Kim et al. |
| D558,704 S | 1/2008 | Mitchell |
| D558,756 S | 1/2008 | Andre et al. |
| D558,757 S | 1/2008 | Andre et al. |
| D558,783 S | 1/2008 | Andre et al. |
| D561,764 S | 2/2008 | Griffin et al. |
| D562,828 S | 2/2008 | Griffin et al. |
| 7,333,326 B2 | 2/2008 | Canova et al. |
| D563,379 S | 3/2008 | Mai et al. |
| D564,499 S | 3/2008 | Ohta |
| D567,246 S | 4/2008 | Lam et al. |
| D568,309 S | 5/2008 | Cebe et al. |
| D571,309 S | 6/2008 | Peter |
| D572,715 S | 7/2008 | Gioscia et al. |
| D573,573 S | 7/2008 | Jung et al. |
| D574,800 S | 8/2008 | Stillerman |
| D575,259 S | 8/2008 | Kim et al. |
| D577,371 S | 9/2008 | Hu et al. |
| D578,153 S | 10/2008 | Huff |
| D578,503 S | 10/2008 | Shin et al. |
| D580,387 S | 11/2008 | Andre et al. |
| D580,929 S | 11/2008 | Kao et al. |
| D581,922 S | 12/2008 | Andre et al. |
| D584,262 S | 1/2009 | Hu et al. |
| D584,269 S | 1/2009 | Baik et al. |
| D584,722 S | 1/2009 | Okkonen |
| D586,800 S | 2/2009 | Andre et al. |
| D587,667 S | 3/2009 | Butan et al. |
| D588,087 S | 3/2009 | Stone |
| D588,563 S | 3/2009 | Oh et al. |
| D588,594 S | 3/2009 | Matsuoka |
| D589,497 S | 3/2009 | Andre et al. |
| D589,919 S | 4/2009 | Bower |
| D589,922 S | 4/2009 | Boyd et al. |
| D589,926 S | 4/2009 | Turner |
| D589,947 S | 4/2009 | Turner |
| D591,709 S | 5/2009 | Rihu |

| | | |
|---|---|---|
| D591,739 S | 5/2009 | Matsuoka |
| D592,166 S | 5/2009 | Song |
| D592,171 S | 5/2009 | Chen |
| D592,172 S | 5/2009 | Chen |
| D592,628 S | 5/2009 | Kim et al. |
| D593,087 S | 5/2009 | Andre et al. |
| D593,522 S | 6/2009 | Chen |
| D593,556 S | 6/2009 | Hofer et al. |
| D593,557 S | 6/2009 | Hofer et al. |
| D600,245 S | 9/2009 | Lam et al. |
| D603,830 S | 11/2009 | Webb et al. |
| D613,294 S | 4/2010 | Lee et al. |
| 2003/0034987 A1 | 2/2003 | Webb et al. |
| 2004/0043801 A1 | 3/2004 | Shimokawatoko et al. |
| 2004/0106429 A1 | 6/2004 | Park et al. |
| 2005/0053225 A1 | 3/2005 | Griffin |
| 2005/0099394 A1 | 5/2005 | Chou et al. |
| 2005/0250562 A1 | 11/2005 | Carroll |
| 2005/0255897 A1 | 11/2005 | Lee et al. |
| 2005/0282576 A1 | 12/2005 | Delker et al. |
| 2006/0007159 A1 | 1/2006 | Lane et al. |
| 2006/0046796 A1 | 3/2006 | Park et al. |
| 2006/0209505 A1 | 9/2006 | Kim |
| 2006/0265643 A1 | 11/2006 | Saft et al. |
| 2007/0074957 A1 | 4/2007 | Lam et al. |
| 2007/0081303 A1 | 4/2007 | Lam et al. |
| 2007/0293272 A1 | 12/2007 | Salmon |
| 2009/0141436 A1 | 6/2009 | Matsuoka et al. |
| 2009/0176542 A1 | 7/2009 | Matsuoka |
| 2009/0227301 A1 | 9/2009 | Lindvall |
| 2010/0004027 A1 | 1/2010 | Jang et al. |
| 2010/0087232 A1* | 4/2010 | Yeh et al. .................. 455/575.4 |
| 2011/0263304 A1* | 10/2011 | Laido et al. ............... 455/575.3 |

OTHER PUBLICATIONS

02 XDA Atom, Nov. 2005, www.gsmarena.com/o2_xda_atom-1372.php.
Alcatel OT 525, 2002, www.gsmarena.com/alcatel_ot_525-351.php.
Alcatel OT 526, 2003, www.gsmarena.com/alcatel_ot_526-403.php.
Asus P552w, announced Sep. 2008, [online], [retrieved on Oct. 3, 2008]. Retrieved from Internet, <url: http://www.gsmarena.com>.
Bohn, Dieter, Xperia X1. "Review: First Impressions of the Xperia X1," Apr. 2, 2008, http://wmexperts.com/reviews/smartphones/review_first_impressions_of_th.html, 6 pages.
Handspring Press Release, Introduction of Treo 600, "Handspring Introduces Smartphone. Design Innovations With Treo 600 Series," Jun. 18, 2003. www.palm.com/us/company/pr/hs_archive/061803.html (2 pages).
Handspring Press Release, Introduction of Treo 180, "Handspring Unites Phone, Messaging and PDA in New Treo Communicator," Oct. 15, 2001. www.palm.com/us/company/pr/hs_archive/061803.html (2 pages)www.palm.com/us/pr/hsarchive/1 01501.html (3 pages).
i-mate JAM, 2004, http://www.gsmarena.com/i_mate_jam-963.php.
i-mate PDA2k, announced 3rd quarter 2004, [online], [retrieved on Dec. 13, 2007]. Retrieved from Internet, <url: http://www.smarena.com>.
LG L5100, 2004, http://www.gsmarena.com/lg_l5100-891.php.
LG U8380, Jun. 2005, http://www.gsmarena.com/lg_u8380-1269.php.
Nokia 6030, 2005 1Q, www.gsmarena.com/nokia_6030-1086.php.
Non-final Office Action for U.S. Appl. No. 29/356,882 mailed on May 24, 2010, 6 pages.
Palm Centro, announced Feb. 2008, [online], [retrieved on Jun. 13, 2008]. Retrieved from Internet,<URL: http://www.gsmarena.com>.
Palm Treo 500v, Sep. 2007, www.gsmarena.com/palm_treo_500v-2100.php.
Palm Tungsten T3 product photos. Product release date Oct. 1, 2003, photos at web site http://www.palminfocenter.com/view_story.asp?ID=6073, 1 page.
Photos of Treo 180: three-quarters view of overall device, close up of keyboard & controls}(2 pages).
Photos ofTreo 600: front view of device and close up of keyboard & controls (2 pages).
Photos ofTreo 650: front view of device and close up of keyboard & controls (2 pages).
Sagem MY X-6, 2003, www.gsmarena.com/sagem_my_x_6-423.php.
Samsung i700, Mar. 2004, http://www.gsmarena.com/samsung_i700-441.php.
T-Mobile Products; Sidekick; http://www.tmobile.com, (Sep. 28, 2002), 3 pages.
Treo 650 Announced, product review and analysis, published on TreoCentral, Oct. 25, 2004. www.treocentral.com/contents/Stories/472-1.htm (4 pages).
International Search Report and Written Opinion of the International Searching Authority, mailed Jan. 13, 2012, issued in related PCT Application No. PCT/US2011/039530.

* cited by examiner

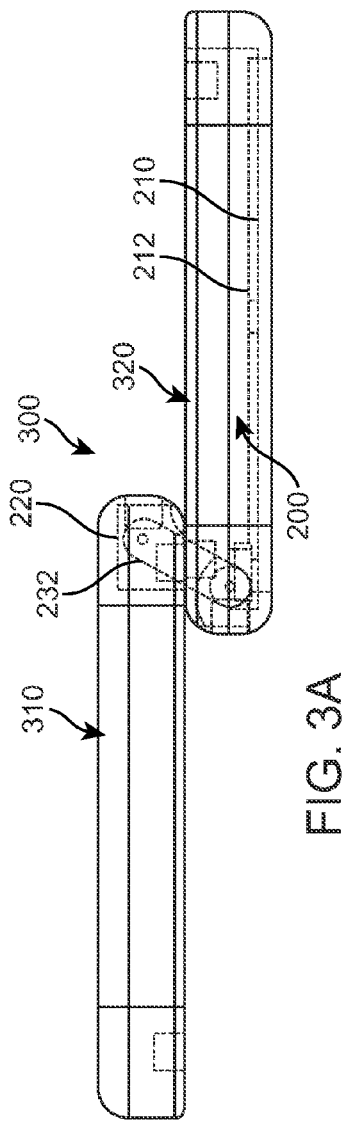
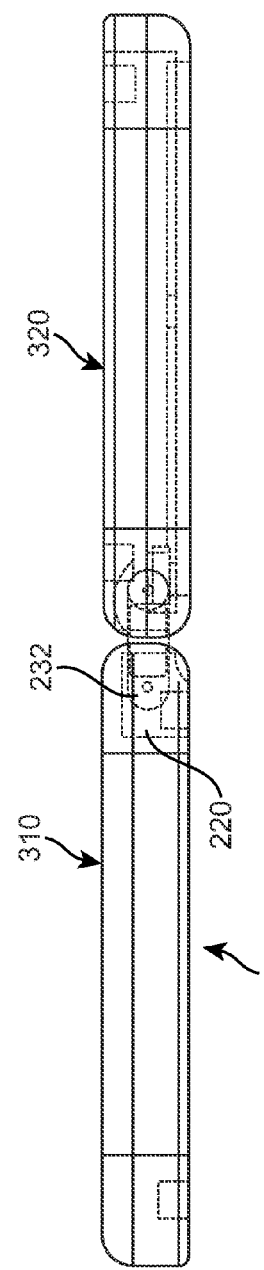
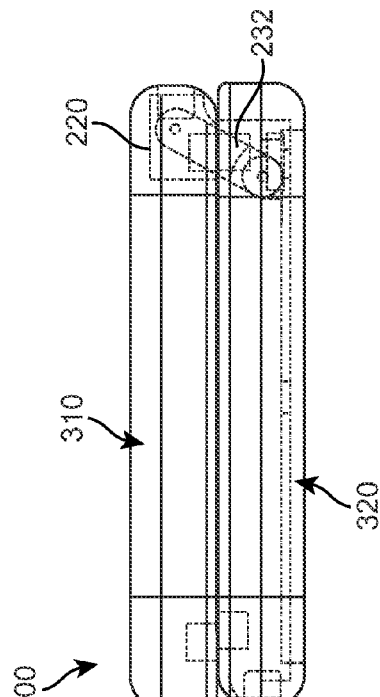
FIG. 3A
FIG. 3B
FIG. 3C

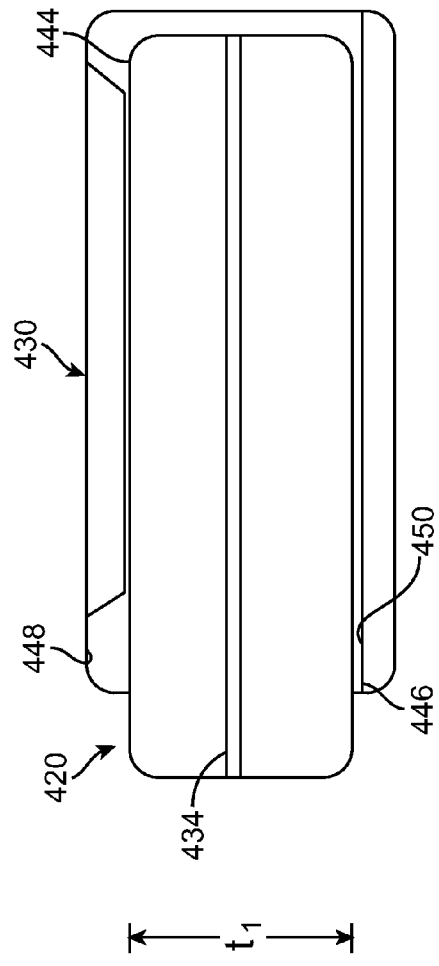
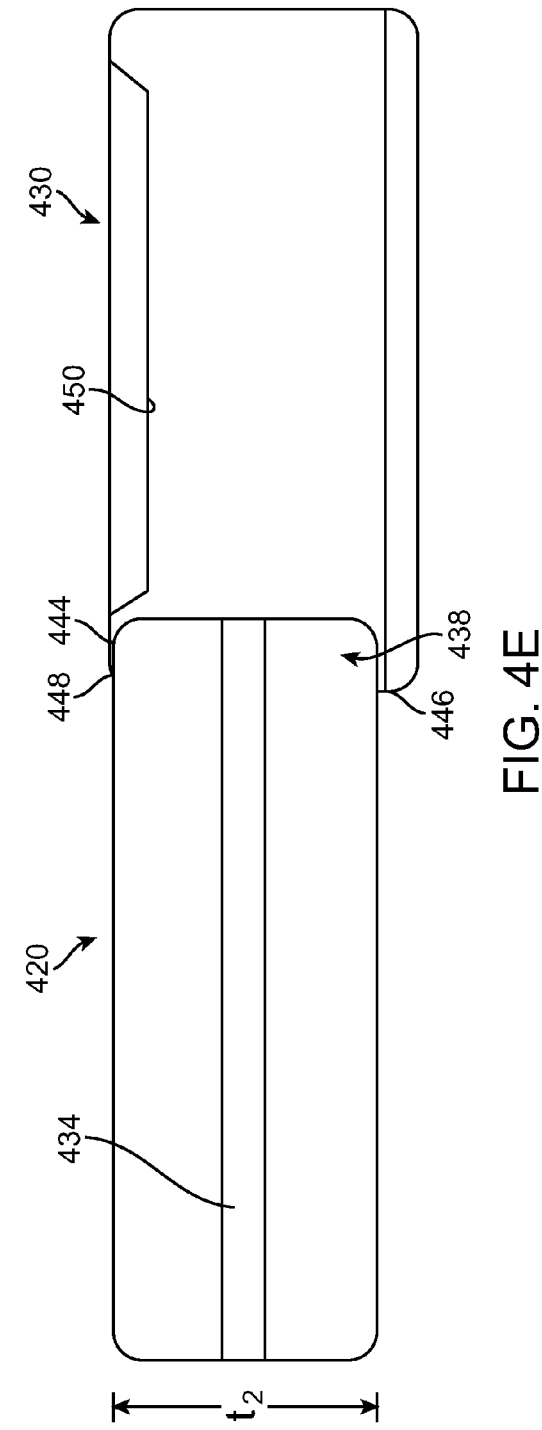

FULLY EXTENDABLE DUAL-SEGMENTED HOUSING ASSEMBLY FOR MOBILE COMPUTING DEVICE

TECHNICAL FIELD

The disclosed embodiments relate to a housing for a mobile computing device, and more specifically, to a fully extendable dual-segmented housing assembly for a mobile computing device.

BACKGROUND

With advance of technology, computing devices, particularly mobile computing devices and other small form-factor computing devices, increasingly are becoming more capable and functional. Mobile computing devices are now used for an assortment of functions, including telephony, messaging, web browsing, media playback, image/video capture, and location based services. At the same time, mobile computing devices are generally designed to be small, to enable devices to be used in one hand or carried in a pocket or purse. Thus, there is limited space to provide input/output features for the various functionality that can be incorporated into a device.

Many devices use a display surface as the primary point of interaction with the user. The display surface can be used to present output (e.g. content), and features for enabling input. For example, touch-sensitive displays are typically used to present virtual keyboards and soft-buttons that can receive input from the user. With this in mind, many devices seek to maximize the display surface area of the device.

BRIEF DESCRIPTION OF THE DRAWINGS

FIG. 1A depicts the mobile computing device in a closed position.

FIG. 1B illustrates the mobile computing device in the partially open position.

FIG. 1C illustrates the mobile computing device in the fully open position.

FIG. 1D illustrates a variation to an embodiment of FIG. 1A through FIG. 1C, in which the first segment can tilt partially upright relative to the second segment, under another embodiment.

FIG. 3A through FIG. 3C are transparent side views of a mobile computing device such as shown with FIG. 1A though FIG. 1C, incorporating a coupling structure such as shown with an embodiment of FIG. 2A, under an embodiment.

FIG. 4A through FIG. 4E illustrate a mobile computing device that is constructed from housing segments that are moveable between a closed and encased position and an open position, according to another embodiment.

FIG. 4A illustrates the mobile computing device in a closed position.

FIG. 4B shows the mobile computing device in a partially open state. FIG. 4C shows the mobile computing device 400 in a fully open state.

FIG. 4C illustrates a device of FIG. 4A and FIG. 4B in a fully open position, coinciding with the interior segment being fully withdrawn from the primary segment, under an embodiment.

FIG. 4D is a side cross-sectional view of FIG. 4A along A-A, showing the interior segment encased within the primary segment.

FIG. 4E is a side cross-sectional view along B-B, showing the interior segment extended from the primary segment.

FIG. 5A illustrates the multi-segmented device in a closed position, according to another embodiment.

FIG. 5B illustrates the multi-segmented device in a fully open position, according to an embodiment.

FIG. 5C illustrates a bottom segment of the multi-segmented device with a first connector.

FIG. 5D illustrates a bottom segment of the multi-segmented device with a second connector.

FIG. 5E is a close-up of circle C in FIG. 5C.

FIG. 5F is a close-up of circle D in FIG. 5C.

FIG. 5G is a close-up of circle E in FIG. 5D.

FIG. 6A shows the computing device in a closed position, according to an embodiment.

FIG. 6B is a side view of FIG. 6A.

FIG. 6C is a side view of a device of FIG. 6A and FIG. 6B in a partially upright position.

FIG. 6D is an isometric view of a device of FIG. 6A and FIG. 6B in a partially upright position.

DETAILED DESCRIPTION

Figure 1A:
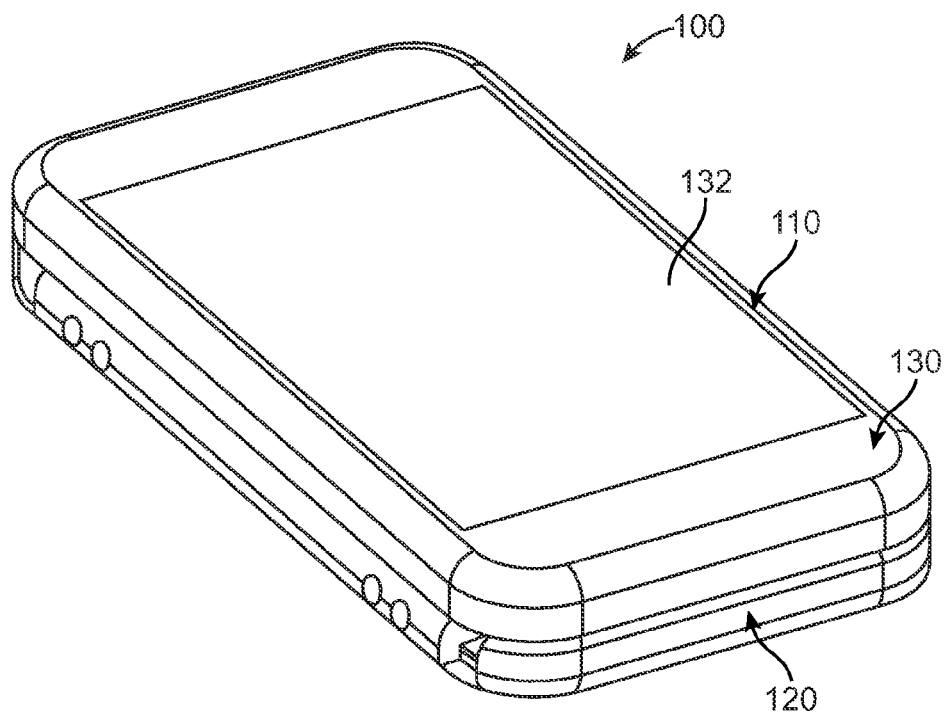
FIG. 1A through FIG. 1D illustrate a mobile computing device that is constructed from housing segments that are moveable between open and closed positions, according to one or more embodiments.

Embodiments described herein include a mobile computing device formed from at least two housing segments that can be moved between positions, including an open position that fully exposes a display surface or façade of each of the housing segments, and a closed position in which at least one of the facades or display surfaces is occluded or overlaid by the other housing segment.

Still further, some embodiments provide for a mobile computing device having at least two housing segments that can be moved between closed and open positions. Each housing segment includes its own display surface. In the closed position, only one of the display surfaces is viewable or fully accessible to the user. In the open position, both display surfaces are fully viewable to the user. Such a construction provides several benefits over many conventional multi-segmented devices. Among the benefits, embodiments provide for a mobile computing device to include a multi-segmented housing that can be extended into a fully open position, in which the façade of both housings are fully viewable without occlusion or obstruction from the other housing.

Additionally, according to some embodiments, a multi-segmented device can include housing segments that can be moved from a closed position towards an open position using linear slider connection mechanism. Such a housing configuration enables the display surface or façade of at least one housing segment to be continuously viewable to the user as the housing segments are extended into the open position. In contrast, conventional designs have used clamshell housing constructions in which two housing segments are separated by a pivoting motion to reveal the facades on each housing segment. In clam shell designs, the display surfaces or facades of one or both housing segments are occluded in the closed position. Furthermore, the transition to the open position requires motioning the only façade that is viewable in the closed position into a hidden position when the clam shell housing is opened. In contrast, some embodiments described herein enable a multi-segmented device to be slid apart and manipulated into a fully opened position, so that the facades of both housing segments are fully viewable to the user.

As used herein, the term "substantial" or its variants (e.g. "substantially") is intended to mean at least 75% of the stated quantity, measurement or expression. The term "majority" is intended to mean more than 50% of such stated quantity, measurement, or expression.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many smart phones and feature phones), and magnetic memory. Computers, terminals, network enabled devices (e.g. mobile devices such as cell phones) are all examples of machines and devices that utilize processors, memory, and instructions stored on computer-readable mediums.

End-to-End Slider Construction

Figure 1B:
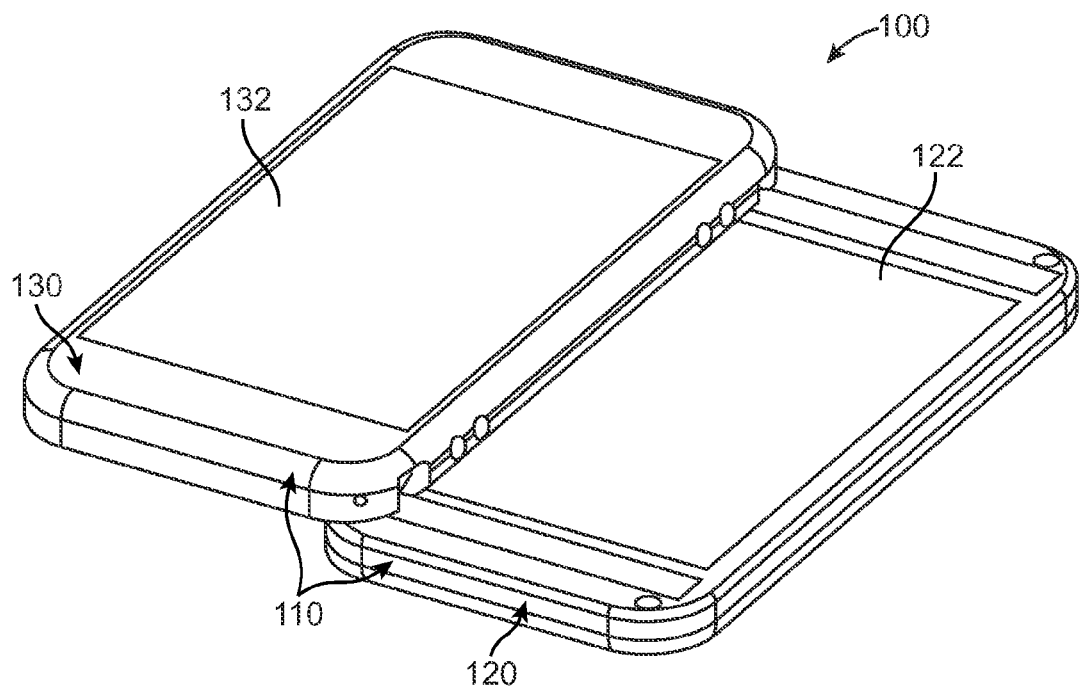
Figure 1C:
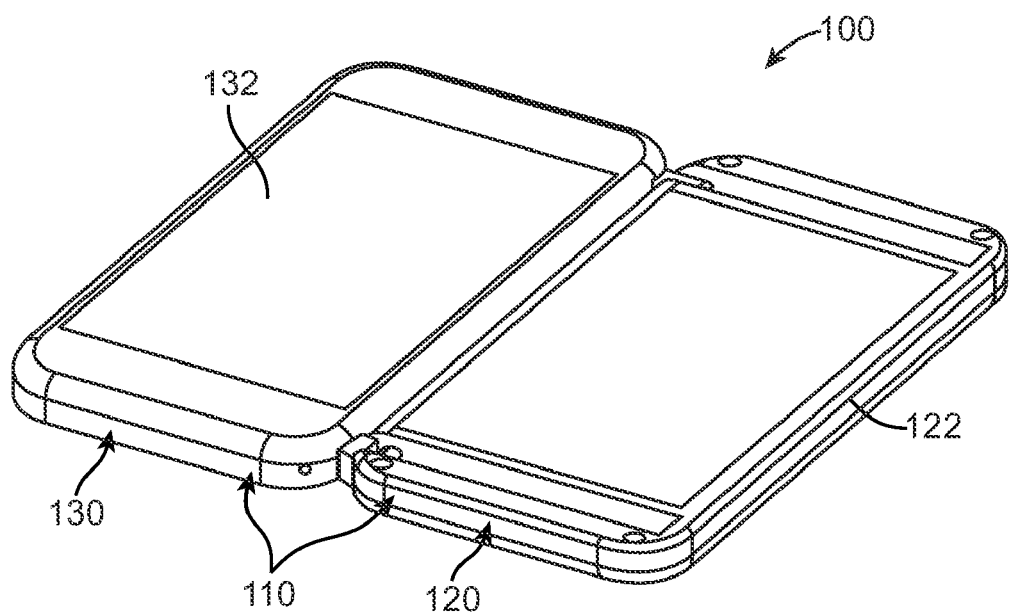

FIG. 1A through FIG. 1C illustrate a mobile computing device that is constructed from housing segments that are moveable between open and closed positions, according to one or more embodiments. A housing 110 of mobile computing device 100 is formed from segments 120 and 130. More specifically, with reference to FIG. 1A, mobile computing device 100 is depicted in the closed position. In FIG. 1B, the mobile computing device 100 is depicted in a partially open state. FIG. 1C shows mobile computing device 100 in a fully open state. As will be described, an embodiment of FIG. 1A through FIG. 1C structures housing segments 120, 130 to move between the various positions using linear translation and pivot motion. As a result, in the closed position, (i) a façade of the second (or top) housing segment 130 is accessible or viewable to the user, while the facade of the first (or bottom) housing segment 120 is not accessible or viewable; (ii) the façade of the second housing segment 130 is continuously viewable as device 100 is manipulated into the fully open position (see FIG. 1C); and (iii) the façade of the first and second housing segments 120, 130 are both fully viewable and/or accessible to the user when the device is in the fully open position.

With further reference to FIG. 1A through FIG. 1C, each segment 120, 130 includes a corresponding display surface 122, 132 as the façade (or majority portion thereof) of the respective segment 120, 130. Each display surface 122, 132 may correspond to, for example, a liquid crystal display (LCD), or organic light emitting diode (OLED) surface. One or both of display surfaces 122, 132 can also be touch sensitive. Thus, mobile computing device 100 may correspond to a dual or mufti-display surface device.

In FIG. 1A, device 100 is in the closed position. The second housing segment 130 is overlaid on the first housing segment 120, so that display surface 132 is accessible to the user, and display surface 122 is occluded or otherwise not accessible to the user. In this position, the device can be operational in one or more modes, such as telephony mode. In telephony mode, the display surface 132 presents dial-pad features and/or caller information, contact information and other telephony/personal information management features. As an alternative or variation, display surface 132 can present content from any one of many possible applications, including for example, a today application or home screen, or an application selected by the user (e.g. messaging or e-mail, web browser, media playback application etc.). Still further, display surface 132 can enable user input by providing user interface functionality such as a virtual keyboard or other input mechanism.

In FIG. 1B, device 100 is in a partially open position. The housing 110 can be manipulated into the partially open position by sliding (or linearly translating) second housing segment 130 apart from the first housing segment 120. A sliding coupling mechanism may be used to enable the linear translation. The second housing segment 130 is moved apart from the first housing segment 120 while the display surface of the second housing segment is continuously viewable to the user. In the partially open position, both display surfaces 122, 132 are at least partially viewable or accessible to the user. Thus, one or more embodiments provide that both of the first and second housing segments 120, 130 are active and responsive to user interaction when the housing 110 is only partially open.

In FIG. 1C, device 100 is in a fully open position. According to some embodiments, the fully open position corresponds to one in which neither of the housing segments 120, 130 are occluded or overlaid by the other housing segment. In some embodiments, housing segments 120, 130 are positioned end-to-end, meaning that the bottom (e.g. south most boundary) of one housing segment (e.g. first or bottom segment) is proximate to the top (e.g. north most boundary) of the other housing segment (e.g. second or top segment). Moreover, one or more embodiments provide that in the fully open position, the first and second segments 120, 130 are substantially co-planer with one another. In order to achieve the fully open and co-planer position, a coupling mechanism of housing 110 can be structured to enable linear translation of first and second segments 120, 130 to at least the partially open state, followed by pivot motion of the second segment 130 about the first segment 120 from the partially open position to the fully open position.

Numerous modes of operation and functionality can be enabled from device 100 in the fully open position. In particular one more embodiments provide that the display surfaces 122, 132 can be combined to display portions of content in a synergistic or combined manner. For example, (i) a video clip can be segmented into portions so that one segment appears on each display screen; and (ii) a picture or document can be split so that a portion of the picture or document appears on each display screen 122, 132, and collectively, the first and second display screens depict the whole of the picture or document. As an alternative or variation, one display surface can be used to provide input mechanism, such as virtual keyboard or soft-buttons, while the other display surface can be used to display content (e.g. web page, e-book) that the user can interact with using input mechanisms displayed on the other display surface.

Figure 1D:
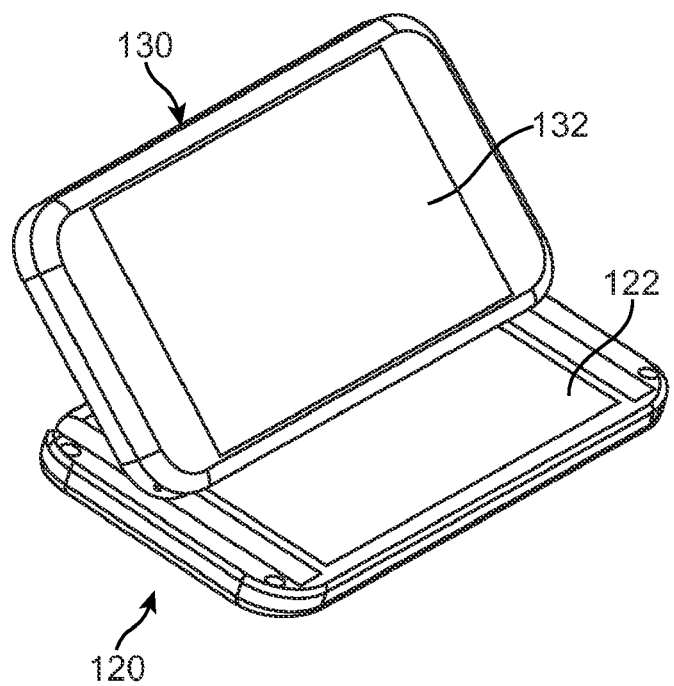

FIG. 1D illustrates a variation in which the top or first segment 130 can tilt relative to the bottom segment. The display surface 132 of the top segment may thus be provided in a tilted orientation relative to the display surface 122 of the bottom or second segment 120. In an embodiment, the coupling mechanism between the segments 120, 130 enables a slant or partial upright position for the top segment when the top segment 130 is in the partially open (as shown in FIG. 1D) or fully open position.

According to some embodiments, first and second segments 120, 130 of housing 110 are balanced in shape and/or weight. In particular, first and second segments 120, 130 can have the same dimensions (length (L), width (W), thickness (t)). Additionally, or as an alternative, the segments 120, 130 have approximate the same weight. The symmetry in dimension and/or weight between the two segments provides a tactile and visual balance to the user manipulating the housing 110 between the closed and open positions.

Figure 2A:
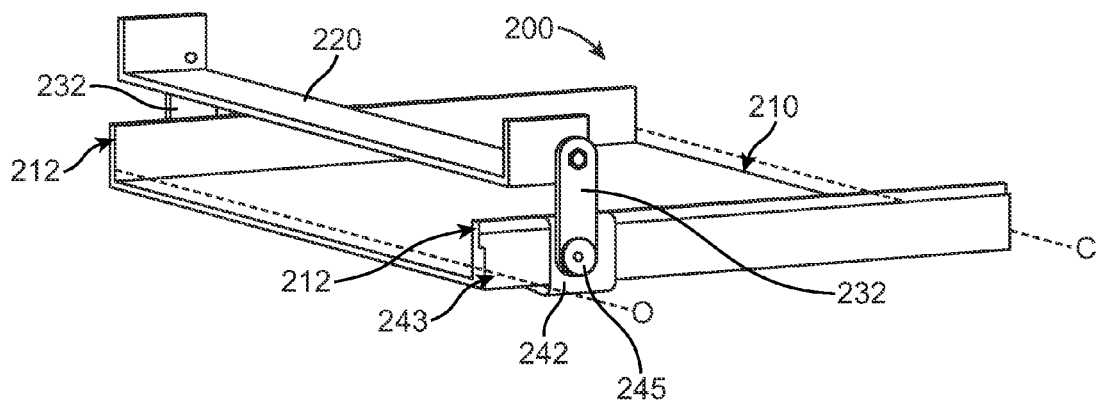
FIG. 2A is an isometric view of a coupling mechanism for use in structuring a move computing device such as described with embodiments of FIG. 1A through FIG. 1C, according to an embodiment.

FIG. 2A is an isometric view of a coupling mechanism for use in structuring a mobile computing device such as described with embodiments of FIG. 1A through FIG. 1C, according to an embodiment. A coupling mechanism 200 includes a slider block 210 having opposing bottom rails 212, and a support structure 220. The slider block 210 integrates with and couples to bottom housing segment 120 (see FIG. 1C). The support structure 220 integrates with and couples to top housing segment 130 (see FIG. 1C). An arm 230, 232 connects the bottom rails 212 of slider block 210 to opposing sides of the support structure 220. The arms 232, 232 connect to sleds 242, 242 (only one visible in FIG. 2A) that are secured on tracks 243, 243 (only one visible in FIG. 2A) formed in each rail. The sleds 242, 242 can linearly translate on each track 243, 243 along a portion of the length of each rail 212, 212. Thus, the arms 232, 232 can slide on opposite sides of the slider block 210.

In one embodiment, the arms 232, 232 are connected by a hinge elements 245 to the corresponding sleds 242, 242. Thus, each arm 232, 232 is able to pivot and translate with respect to the rails 212, 212. The arms 232, 232 can linearly translate between positions (O, C), and at position (O), pivot downward so as to be horizontal or planar with the block 210.

Each arm 232, 232 is also pivotally connected to the support structure 220. The pivot connection with the support structure 220 enables the support structure to be laid flat (or co-planar) with respect to the slider block 210. Thus, in the open position, the arms 232, 232 can be pivoted downward so that the support structure 220 (integrated with the second or top segment 230) is co-planar with the first or bottom segment 220.

With reference to an embodiment of FIG. 1D, coupling mechanism 200 can also be manipulated to enable a slant orientation in either the partially open or fully open position.

Figure 2B:
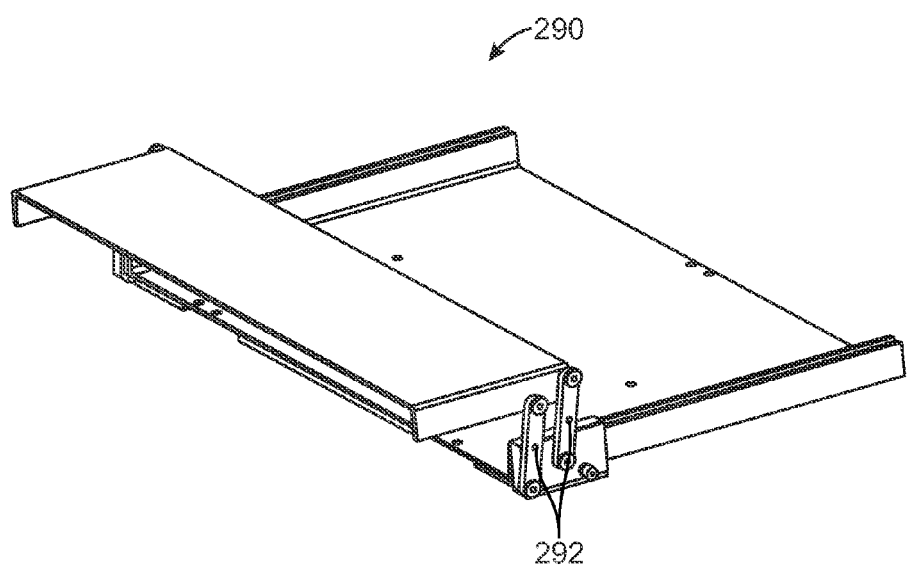
FIG. 2B illustrates a variation to a coupling mechanism of FIG. 2A, according to another embodiment.

FIG. 2B illustrates a variation to a coupling mechanism of FIG. 2A, according to another embodiment. The coupling mechanism 290 is structured to operate in a manner similar to an embodiment described with FIG. 2A. Rather than use arm 232 on each rail to enable pivot motion with linear motion, the coupling mechanism 290 uses a two-arm set 292 on each rail. The use of the additional arm 292 on each side can enhance durability of the coupling mechanism 290.

FIG. 3A through FIG. 3C are transparent side views of a mobile computing device such as shown with FIG. 1A though FIG. 1C, incorporating a coupling structure such as shown with an embodiment of FIG. 2A, under an embodiment. With reference to FIG. 3A through FIG. 3C, a mobile computing device 300 includes a housing formed by top and bottom segments 310, 320. The two segments 310, 320 include coupling structure 200, having the slider block 210 and rails 212 integrated with the bottom segment 310, and the support structure 220 integrated with the top segment 320. The use of the coupling structure 200 enables the two segments 310, 320 to (i) linearly translate between a closed position (FIG. 3C) and a partially open position (FIG. 3A), and (ii) pivot from the partially open position to the fully open position (FIG. 3B).

In FIG. 3A, the mobile computing device 300 is depicted in the partially open position. In this position, the top segment 320 partially overlays or occludes the bottom segment 310. Each segment may include a display surface or façade, and in the partially open position, the display surface and/or façade of the bottom segment 310 is partially occluded by the top segment. In the partially open position, the arms 232 of the coupling structure 200, are translated via sleds 242 (see FIG. 2A) along tracks 243 (see FIG. 2A) of the rails 212, from the closed position to the partially open position.

In FIG. 3B, the mobile computing device 300 is depicted in the fully open position. In this position, the top segment 320 is fully separated from the bottom segment, so that no portion of the bottom segment 310 is occluded by the top segment. Moreover, according to some embodiments, the coupling structure 200 enables a support structure 220, which is integrated with the top segment 320, to pivot downward from the partially open position into the fully open position. This allows the top segment 320 to be co-planar and aligned end-to-end with respect to the bottom segment 310. Thus, the top segment 320 is moved from the closed position to the partially open position by linear translation, and from the partially open position to the fully open position by pivot.

In FIG. 3C, the mobile computing device 300 is depicted in the closed position. The top segment 320 can be moved from the fully open position to the closed position by pivoting from the fully open position to the partially open position, then translating linearly from the partially open position to the closed position.

Internal Slider Construction

Figure 4A:
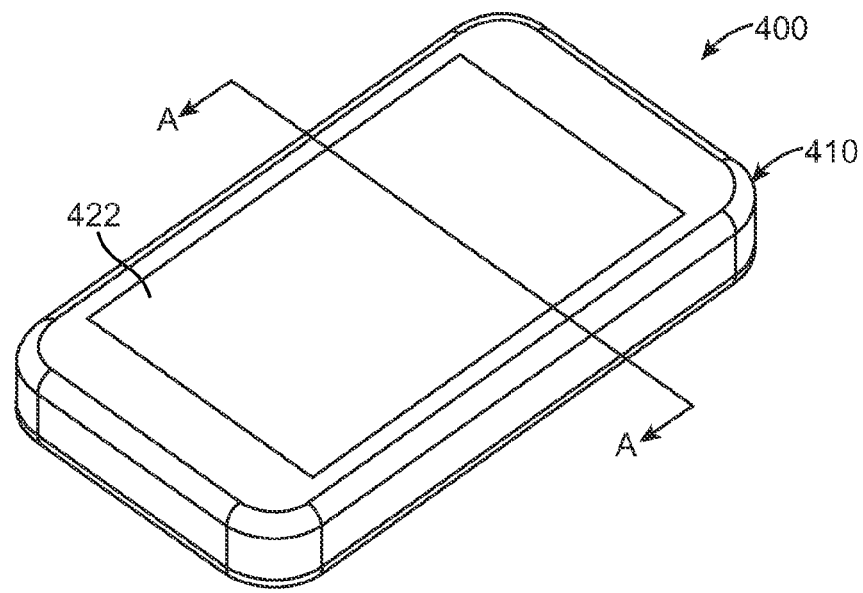
Figure 4B:
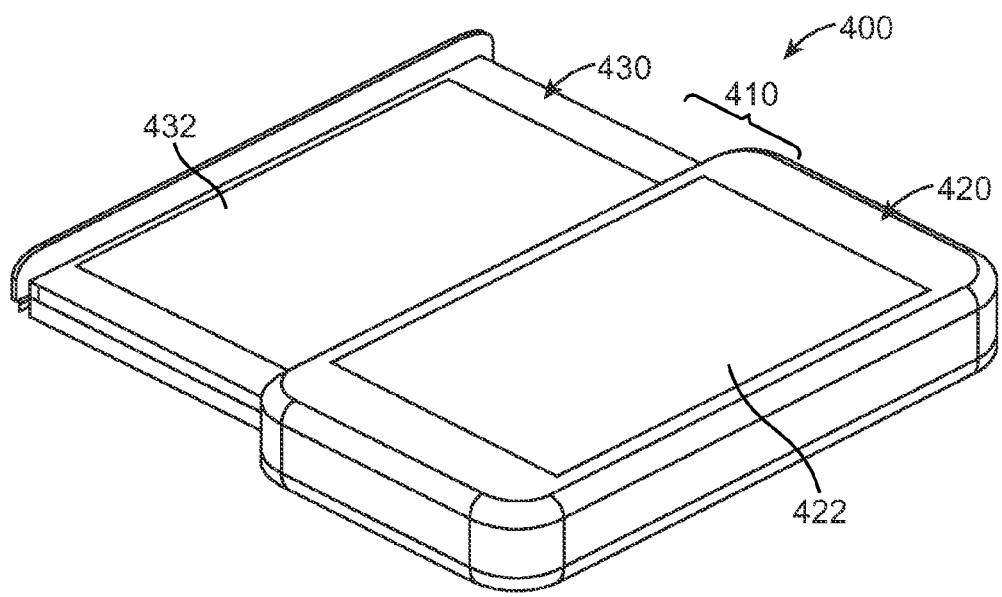
Figure 4C:
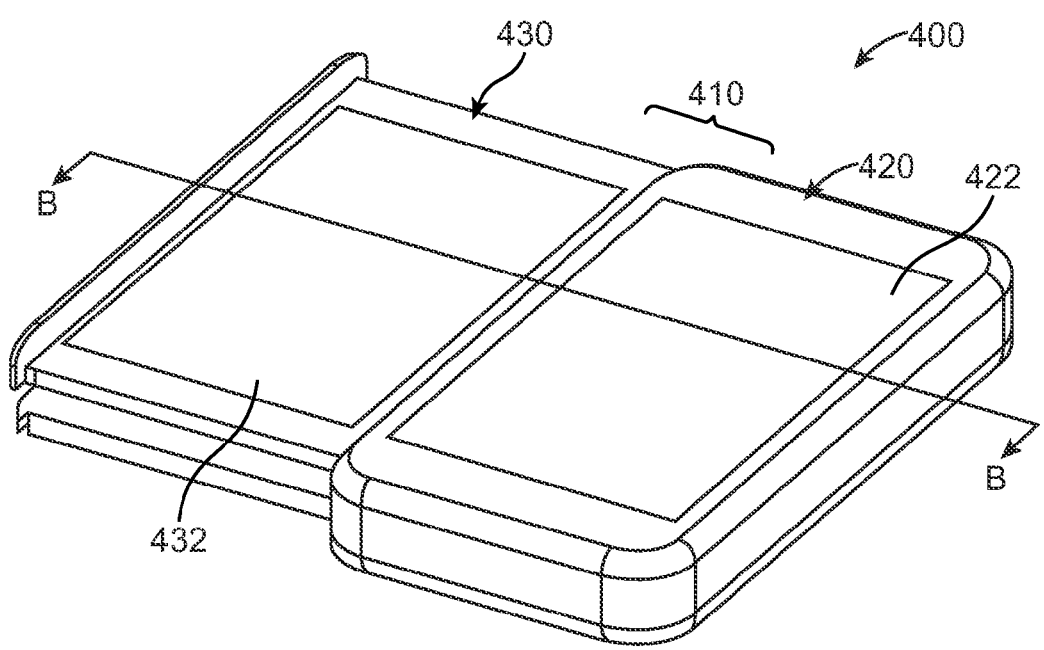

FIG. 4A through FIG. 4C illustrate a mobile computing device that is constructed from housing segments that are moveable between a closed and encased position and an open position, according to one or more embodiments. A housing 410 of mobile computing device 400 is formed from primary and interior segments 420 and 430, respectively. More specifically, with reference to FIG. 4A, mobile computing device 400 is depicted in the closed and encased position. In FIG. 4B, the mobile computing device 400 is depicted in a partially open state. FIG. 4C shows mobile computing device 400 in a fully open state. As will be described, an embodiment of FIG. 4A through FIG. 4C structures segments 420, 430 to move between the various positions using linear translation and, optionally, pivot or pop-up motion. As a result, in the closed position, (i) a façade of the primary segment 420 is accessible or viewable to the user, while the façade of the interior (or secondary) segment 430 is not accessible or viewable; (ii) the façade of the primary segment 420 is continuously viewable as the device 400 is manipulated into the fully open position (see FIG. 4C); and (iii) the façade of the primary and interior (or secondary) housing segments 420, 430 are both fully viewable and/or accessible to the user when the device is in the fully open position.

With further reference to FIG. 4A through FIG. 4C, each segment 420, 430 includes a corresponding display surface 422, 432 as the façade (or majority portion thereof) of the respective segment 420, 430. Each display surface 422, 432 may correspond to, for example, a liquid crystal display (LCD), or organic light emitting diode (OLED) surface. One or both of display surfaces 422, 432 can also be touch sensitive. Thus, mobile computing device 400 can correspond to a dual or multi-display surface device.

In FIG. 4A, device 400 is in the closed position. The interior segment 430 is encased within the primary segment 420, so that display surface 432 of the interior segment 430 is occluded or not accessible to the user, and display surface 422 of the primary segment 420 is accessible to the user. As with other embodiments, the device can be operational when in the closed position to operate in a device mode, launch applications, provide input features and other functionality. The primary interface feature may be display surface 422, which can display output and optionally receive input (e.g. when touch-sensitive).

In FIG. 4B, device 400 is in a partially open position. The housing 410 can be manipulated into the partially open position by sliding (or linearly translating) interior segment 430 from an interior void of the primary housing segment 420. In one embodiment, the interior segment 420 is latched under bias in the closed position, and then unlatched to spring into the partially open position. (see FIG. 4D and FIG. 4E) The interior segment 430 is moved apart from the primary segment 420 while the display surface 422 of the primary segment is continuously viewable to the user. In the partially open position, both display surfaces 422, 432 are at least partially viewable or accessible to the user. Thus, one or more embodiments provide that both of the primary and interior segments 420, 430 are active and responsive to user interaction when the housing 410 is only in the partially open state.

In FIG. 4C, device 400 is in a fully open position, coinciding with interior segment 430 being fully withdrawn from the primary segment 420. In an embodiment, the securement between the interior segment 430 and the primary segment 420 is such that the interior segment 430 pushes up and out when withdrawn into the fully open position. This, the display surface 432 of the interior segment 430 is flush with the display surface 422 of the primary segment 420. In one implementation, the interior segment 420 is biased to spring from the closed position into the fully open position. In another implementation, the interior segment 420 is manually pulled or manipulated to be in the fully open position.

FIG. 4D is a side cross-sectional view of FIG. 4A along A-A, showing the interior segment 430 encased within the primary segment 420. FIG. 4E is a side cross-sectional view along B-B, showing the interior segment 430 extended from the primary segment 420. As mentioned, the interior segment 430 can be released from the confines of the primary segment 420 under bias, and also structured to 'pop-up' when fully released.

In more detail, the primary segment 420 includes a void 450 that is dimensioned to receive the interior segment 430. The interior segment 430 is structured to be expandable in thickness. In one embodiment, the interior segment 430 includes an interior structure 434 that occupies a mid-portion of the overall thickness of the interior segment 430, and is spring-loaded to expand when it is outside the confines of the primary segment 420. From the closed position, the interior segment 430 can be moved linearly within the void 450 to the fully open position. The interior structure 434 can relax and increase in thickness when outside of the confines of void 450. Thus, the interior segment 430 may have a thickness $t_1$ when housed within the primary segment 420, and a thickness $t_2$ that is greater than $t_1$ when released from the primary segment's confines. When expanded, the display surface 432 (or façade) of the interior segment 430 may be substantially flush with the display surface 422 (or facade) of the primary segment 420. When expanded, the interior segment may include a tail section 438 that is retained within the interior void 450 of the primary segment. An overall thickness of the interior segment 430 may approach the thickness of the primary segment 420.

Within the confines, the interior segment 430 can use spring loaded protrusions 444, magnets and/or other mechanisms to retain the interior segment within the primary segment 420. Retention mechanisms 446, 448 or similar mechanisms can be used to retain the tail segment 434 of the interior segment 420 within the void 450 of the primary segment 430. In this way, the interior segment 430 can release from the closed position and pop-up into the fully open position.

Detachable Segments Arrangeable in Open/Closed Positions

Figure 5A:
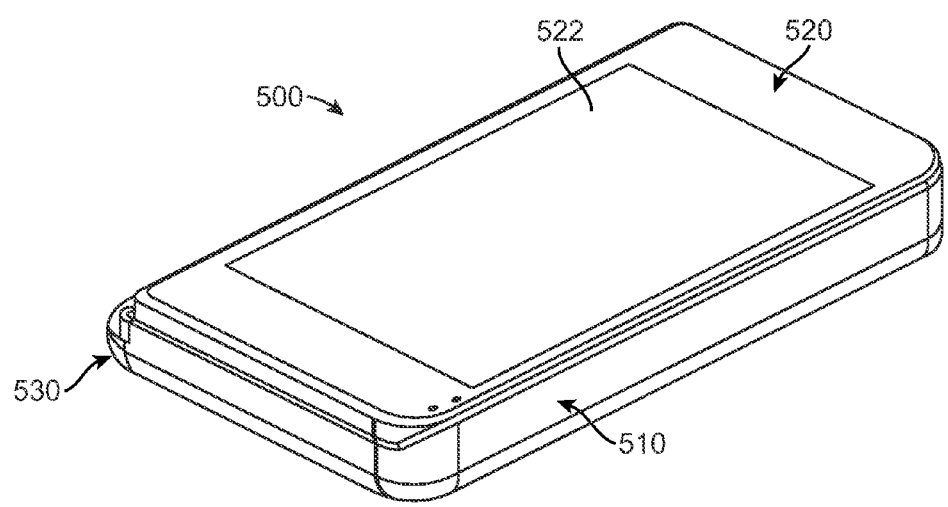
FIG. 5A through FIG. 5G illustrate a mobile computing device that is constructed from housing segments that are moveable and detachable between closed and open positions, according to one or more embodiments.
Figure 5B:
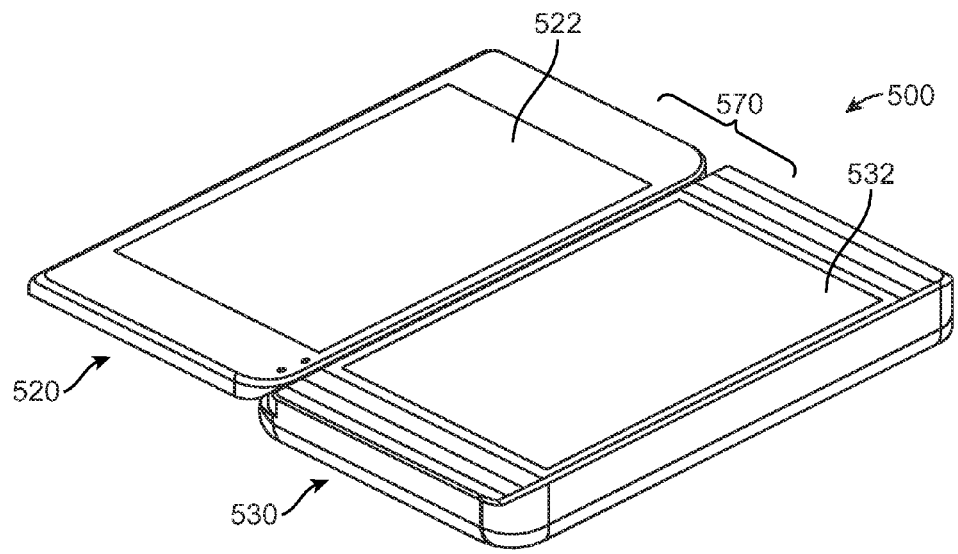
Figure 5C:
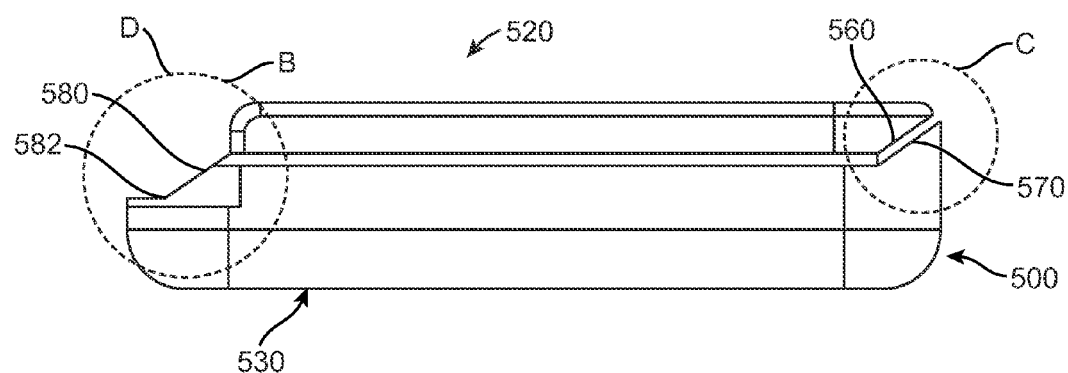

FIG. 5A through FIG. 5G illustrate a mobile computing device that is constructed from housing segments that are moveable and detachable between closed and open positions, according to one or more embodiments. A housing 510 of mobile computing device 500 is formed from primary and interior segments 520 and 530, respectively. More specifically, with reference to FIG. 5A, mobile computing device 500 is depicted in the closed position. In FIG. 5B, the mobile computing device 500 is depicted in a partially open state. FIG. 5C shows mobile computing device 500 in a fully open state. As will be described, in embodiment of FIG. 5A through FIG. 5C, housing segments 520, 530 are structured to be moved and/or lifted between one or more positions that include open (two segments extended) and closed positions. In some embodiments, two segments can be arranged in open/ closed positions by (i) moving top segment 520 against bottom segment 530, or (ii) lifting and repositioning the top segment 520 from one position to another. The movement of the top segment 520 relative to the bottom segment 530 can be accomplished using linear translation. In an embodiment, in the closed position, (i) a façade of the top segment 520 is accessible or viewable to the user, while the façade of the bottom segment 530 is not accessible or viewable; and (ii) the façade of the top segment 520 can optionally be moved or lifted between open and closed positions; (iii) the façade of the top and bottom segments 520, 530 are both fully viewable and/or accessible to the user when the device is in the fully open position.

With further reference to FIG. 5A and FIG. 5B, an embodiment provides that each segment 520, 530 is operable using a set of components that are contained in that unit. Additionally each segment 520, 530 includes a corresponding display surface 522, 532 as the façade (or majority portion thereof) of the respective segment 520, 530. One or both of display surfaces 522, 532 can also be touch sensitive. In such a configuration, each segment 520 can include its own resources for power, memory and processing. Such a configuration enables the two segments 520, 530 to be lifted or detached from one another and operated individually, or even independently of one another.

Figure 5D:
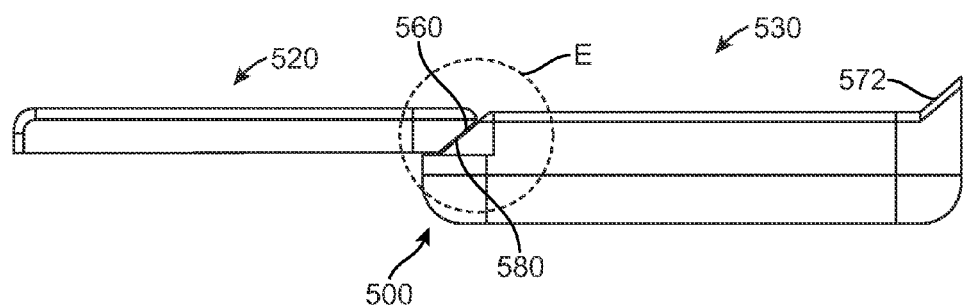

In order to enable segments 520, 530 to separate from one another, one of more embodiments provide for the two segments to be connectable using connection ports that can be disconnected or discontinued when the two segments are separated. Thus, the two segments 520, 530 can connect and communicate with one another (in the connected position) without use of permanent and persistent connection mediums, such as flex cables. FIG. 5C and FIG. 5D illustrate how connector ports can be formed on a multi-segment computing device such as shown and described with FIG. 5A and FIG. 5B.

In one embodiment, the two segments 520, 530 can be operated in a connected mode where the segments recognize they are connected, and synchronize their functionality or display content to achieve a common functional goal (e.g. display different pages of an e-book, provide virtual keyboard and webpage, show video on split screen etc.). The two segments 520, 530 can also be operated in an unconnected mode, in which one or both segments can be operated independently (or without use of resources) from the other segment.

In FIG. 5A, device 500 is in the closed position. The top segment 520 is positioned over the bottom segment 530, so that display surface 522 of the top segment 520 occludes the display surface 532 (see FIG. 5B) of the bottom segment 530. As with other embodiments, the device can be operational when in the closed position to operate in a device mode, launch applications, provide input features and other functionality. Thus, for example, that display surface 522 of the top segment may be active, so the display surface 532 of the bottom segment 530 may be inactive, and the two segments may share resources (e.g. memory and battery, wireless radio etc.) so that the two segments act as one unit to the user.

In FIG. 5B, device 500 is in a fully open position, corresponding to the top segment 520 being re-positioned relative to the bottom segment 530 to be in the open position. The top segment 520 can be repositioned either by linear translation or by lift and placement. In the open position, the display surfaces 522, 532 of both segments are fully viewable and usable in a manner such as described with other embodiments.

As mentioned, in embodiment such as described with FIG. 5A and FIG. 5B can enable communication between the two segments 520, 530 without use of a continuous physical connection (e.g. such as flex cable) between the two segments. Rather, the two segments can be connected using connection ports that form when one segment is moved or repositioned against the other. To enable the formation of such connections, one or both segments 520, 530 can be equipped with duplicative connectors.

FIG. 5C and FIG. 5D illustrate an embodiment in which bottom segment 530 includes a pair of duplicate of connectors 570, 580. Each connector 570, 580 in the pair is able to mate with the same connector 560 of the top segment 520. In FIG. 5C, device 500 is in the closed position. The connector 560 of the top segment 520 mates with connector 570 of the bottom segment 530, with a shaped or slanted surface 562 of top segment 520 mating with an accommodating surface 572 on the bottom segment 520. In FIG. 5D, device 500 is in the open position. The connector 560 of the top segment 520 mates with connector 580 the bottom segment 530. The shaped or slanted surface 562 rests against the a corresponding second surface 582 of the bottom segment 530.

Various kinds of connectors and connector ports can be used in order to enable the two segments to mate in the open and closed positions. In one implementation, the connector 560 of the top segment 520 (or conversely bottom segment 530) is a male push-pin (sometimes referred to as pogo style). Connectors 570, 580 of the bottom segment 530 are female connectors to receive connector 560 in either the open or closed position. In other implementations, the male/female orientations amongst the devices can be switched, and alternative forms of connectors can be used. As an addition or alternative, an inductive data and/or power connector can be used between the two devices (e.g. see U.S. patent application Ser. No. 12/239,656, filed Sep. 26, 2008 and incorporated by reference herein).

According to some embodiments, top and bottom segment 520, 530 latch to one another when in the open and closed positions. The latching mechanism can use physical retention mechanisms, such as biased male/female securements. Alternatively, the latching mechanism can use magnetic retention mechanisms. In the latter case, the devices are equipped with magnetic material (or magnetically attracted materials) to enable a magnetic securement to be formed between the two devices. The magnetic material can be distributed on the end of the devices, to coincide with the position of the connector formed between the two segments.

Figure 5E:
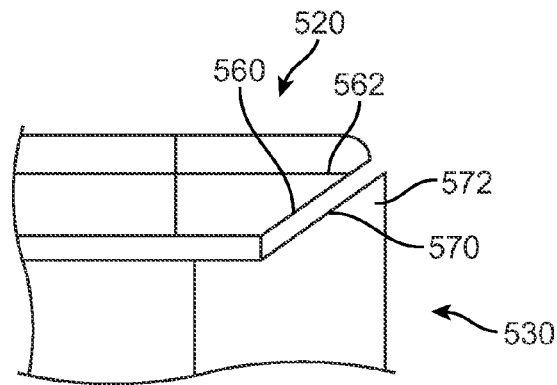

FIG. 5E is a close-up of circle C in FIG. 5C, showing the use of shaped mating surfaces on the top and bottom segments 520, 530 when the segments are mated and in the closed position. In an embodiment such as shown, the top and bottom segments 520, 530 include the slanted surfaces 562, 572 that abut or meet to form the electrical connection between the two segments. The electrical connectors 560, 570 of each of the top/bottom segments 520, 530 are positioned on the respective slanted surfaces 562, 572. Likewise, magnetic material used to create the securement between the two segments can also be positioned at or near the slanted surfaces, so that the two segments are biased towards forming the magnetic securement when the slanted surfaces come near one another.

Figure 5F:
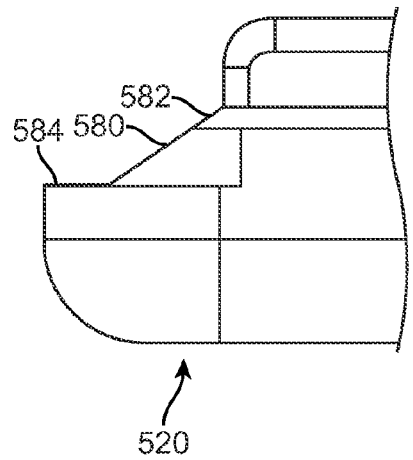

FIG. 5F is a closeup of circle D in FIG. 5C, showing unmated surface of the bottom segment 530 when the top and bottom segments are mated in the open position. As described above, the bottom segment 530 includes slanted surface 582 for receiving the slanted surface 564 of the top segment 520 in the open position (see FIG. 5B). In one implementation, the slanted surface 582 is adjoined to ledge 584 and is shaped to receive the corresponding surface 564 (see FIG. 5G) of the top segment 520 (see FIG. 5G). The slanted surface 582 is combined or coupled to its own connector 580 which mates with the connector 560 of the top segment 520 when the two segments are positioned in the open position (see FIG. 5G). As shown and described with FIG. 5B, an embodiment provides that the slanted surface 582 is combined with magnets or magnetically attractive material for magnetically coupling to the top segment 520 and retaining the top segment in the open position.

Figure 5G:
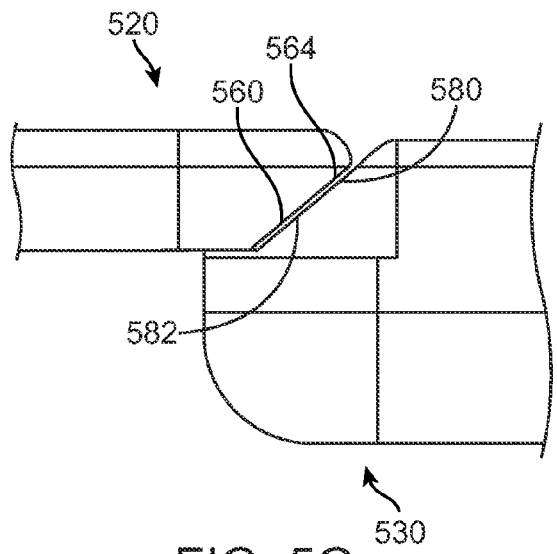

FIG. 5G is a close-up of circle E in FIG. 5D, showing the use of shaped mating surfaces 564, 582 on the top and bottom segments 520, 530 when the segments are mated and in the open position. The two segments 520, 530 may electrically communicate using connectors 560, 580. As described, the segments 520, 530 may be retained against one another using magnets.

Figure 6A:
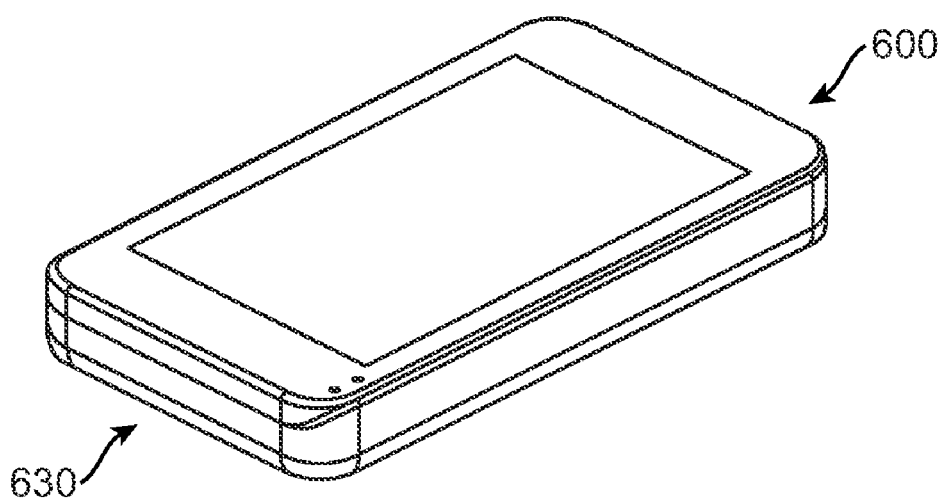
FIG. 6A through FIG. 6D illustrate a variation to an embodiment such as described with FIG. 5A through 5G, according to another embodiment.
Figure 6B:
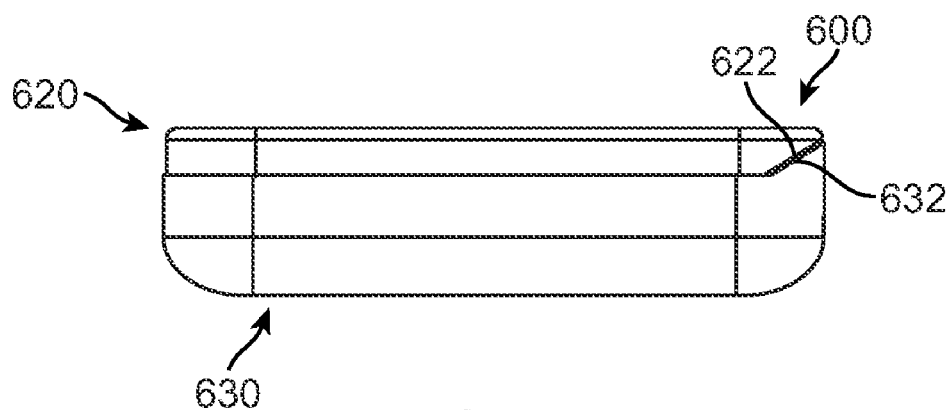

FIG. 6A through FIG. 6D illustrate a variation to an embodiment such as described with FIG. 5A through 5G. With reference to FIG. 6A, a computing device 600 is depicted in a closed position, with a top segment 620 overlaid on a bottom segment 620. FIG. 6B is a side view of FIG. 6A, showing a mating surface for top segment 620 and bottom segment 630. The mating surface may resemble the configuration and structure shown and described with, for example, an embodiment of FIG. 5E. Accordingly, the bottom segment 630 may include a shaped or slanted surface 632 on which a connector is provided. The top segment 620 also includes a similarly shaped or slanted surface 622 on which a corresponding connector is provided. The two surfaces can be actively retained against one another using magnetic or mechanical latching.

The top segment 620 can be moved from the closed position to the open position by either (i) sliding the top segment 620 along its mating surface 622 to an open position, (ii) lifting and repositioning the top segment 620 at the desired position.

Figure 6C:
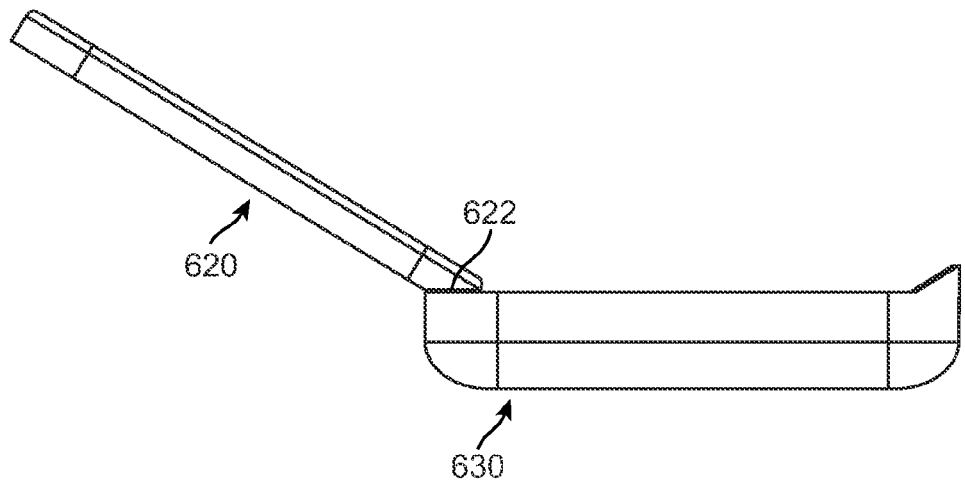
Figure 6D:
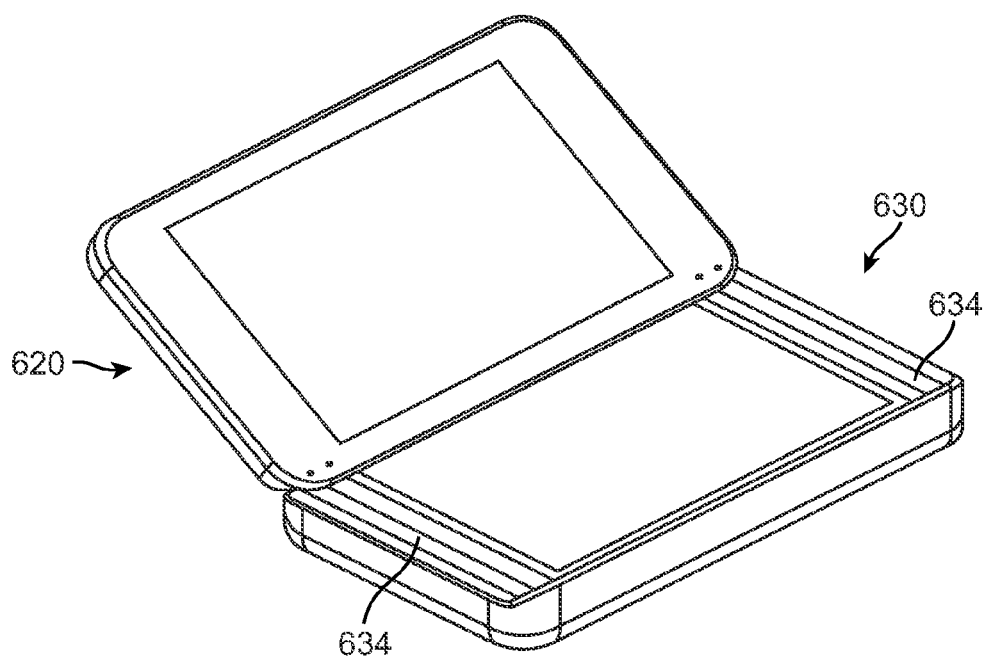

With reference to FIG. 6C and FIG. 6D, one embodiment provides that the top and bottom segments 620, 630 are actively retained against one another when the top segment is slid to the open position using magnetic latching. In particular, the mating surface 622 of top segment 620 may include a magnet. The bottom segment 630 includes track surfaces 634 formed from magnetically attractive material. The magnet and the magnetic attractive material can be aligned to enable magnetic coupling and movement. More specifically, when properly aligned and positioned, the top segment 620 can be slid along its mating surface 622 over the track surfaces 634. The combination of magnet and magnetically attracted surface enables the top segment 620 and bottom segment 630 to bias towards maintaining a physical connection, unless the user exerts sufficient force (e.g. lift) to separate the two devices.

As shown by FIG. 6C and FIG. 6D, the top and bottom segments 620, 630 may be arranged in the open position with the top segment being partially upright, rather than flat or end-to-end with bottom segment 630. To enable this connection, the bottom segment 630 may include a duplicative connector on an edge of the façade where the mating surface 622 of the top segment 620 rests against. As described with one or more other embodiments, the mating surface of the bottom segment 630 where the duplicative connector for the open position is provided may be magnetized to retain the top segment 620. The mating surface 622 of the top segment 620 may be slanted or shaped to form an acute angle in which the top segment 620 is held partially upright. The mating surface 622 may be slanted and rested on a relatively flat surface of the bottom connector (where its connector is positioned) to achieve the acute, partially upright position. As with an embodiment of FIG. 5A through FIG. 5G, an embodiment such as described with FIG. 6A through FIG. 6D enables two segments to connect without use of flex cables present in more conventional multi-segmented devices. A configuration such as shown in FIG. 6A through FIG. 6D also enables the display surface to tilt to enhance usability. The slanted display also hides or occludes the second connector (e.g. connector 580 of FIG. 5D) of the bottom segment 630.

Hardware Diagram

Figure 7:
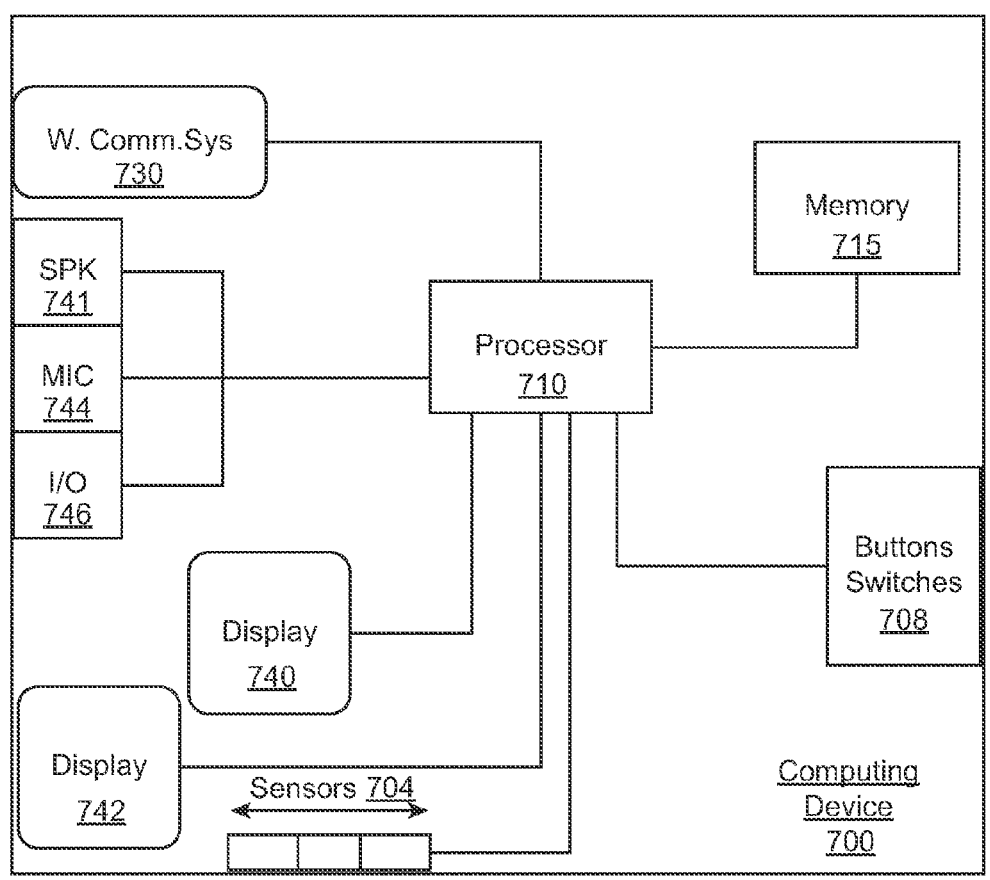
FIG. 7 is a hardware diagram for a computing device that is configured in accordance with embodiments described herein.

FIG. 7 is a hardware diagram for a computing device that is configured in accordance with embodiments described herein. An embodiment of FIG. 7 is depicted as a mobile computing device 700, which may correspond to any device that includes roaming wireless network and/or telephony capabilities, including cellular telephony devices and/or mobile messengers. As described with various embodiments, the device 700 is multi-segmented, so that the housing of the device includes segments that can be extended between open and closed positions (see prior discussed embodiments).

Embodiments described herein may apply to numerous kinds of mobile or small form-factor computing devices. One type of mobile computing device that may be configured to include embodiments described herein includes a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Mobile computing devices in particular may have numerous types of input mechanisms and user-interface features, such as keyboards or keypads, multi-directional or navigation buttons, application or action buttons, and contact or touch-sensitive display screens. Some devices may include combinations of keyboard, button panel area, and display screen (which may optionally be contact-sensitive) on one façade. The button panel region may occupy a band between the keypad and the display area, and include a navigation button and multiple application buttons or action buttons.

Specific types of messaging that may be performed includes messaging for email applications, Short Message Service (SMS) messages, Multimedia Message Service (MMS) messages, and proprietary voice exchange applications (such as SKYPE). Still further, other types of computing device contemplated with embodiments described herein include laptop or notebook computers, ultra-mobile computers, personal digital assistants, and other multi-functional computing devices.

Still further, one or more embodiments may be implemented through any type of computing device is a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

According to an embodiment, the multi-segmented device 700 may include one or more processors 710 (as processing resources), memory resources 715, one or more wireless communication ports 730, and various input/output features. In some embodiments, the multi-segmented device 700 includes two (or more) display assembly 740, 742, in order to provide a separate display surface on each housing segment. One or both display assemblies 740, 740 include integrated sensors to detect various forms of user interaction. For example, the sensors can be resistive, capacitive or optical. Resistive sensors can be pressure sensitive to detect fingers or other objects that press on the display surface. Capacitive sensors can detect touch (or closeness) of human skin. Similarly, optical sensors can detect presence of fingers or other objects. Each display assembly 740, 742 can be structured to have the same ability or functionality of the other display assembly. Alternatively, one display assembly may have reduced functionality (e.g. display only, without ability to detect user interaction), or quality/capability (e.g. display resolution). As mentioned with some embodiments, the processor 710 may operate the devices synchronously, or independently of one another. The processor 710 can implement modal operation, to, for example activate one of the display surfaces when the segments of the device housing are in the closed position, and activate both display surfaces when the segments of the housing are in the open position.

Numerous other input/output features and components may be included with the computing device 700. These include a speaker 741, a microphone 744 and other input/output mechanisms 746. The display assembly 740 may be contact-sensitive (to detect presence of objects), and more specifically, touch-sensitive, to detect presence of human skin (such as the motion of a finger). According to some embodiments, the display assembly 740 provides the interface by which the user may enter input movements to interact with applications and application content.

The device 700 may also include orientation sensors 704 to detect an orientation of the device 700. In some embodiments, the processor 710 may orient one or both of the displays 740, 742 to be in portrait, landscape or other orientation, based on a detected orientation of the device 700. For example, when the segments of device 700 are in the closed position, the processor 700 may orient the active display surface (the one that is visible to the user). In the open position, one or both display surfaces may have orientation selected based on the orientation of the device.

While an embodiment of FIG. 7 illustrates device 700 having one set of core components (e.g. processor 710, memory 715), some embodiments provide that the device 700 includes one set of components on each segment. In such an embodiment, each segment of the device housing may include, for example, its own processor 710, memory 715, power supply (not shown in FIG. 7) and display assembly 740, 742. Such an embodiment can enable, for example, devices to be segments to be separated from one another, as described with embodiments of FIG. 5A-5G and FIG. 6A through FIG. 6D.

As an addition or alternative, the processor 710 may include detectors or sensors that detect the orientation of the two housing segments relative to one another. In particular, the processor 710 may detect whether the two segments that comprise the housing are in the fully open position or in the closed position. In one embodiment, the processor 710 may also detect whether the two segments are in one of the partially open positions (or in any position between fully open or closed). The processor 710 may also be configured to respond to the detected orientation. For example, processor 710 may automatically launch an application or mode setting (such as described with one of the scenarios detailed below) when a given open/closed or partially open position is detected.

Usage Scenarios

With reference to structures of embodiments described above, the processor 710 of the computing device can include software or configurations to operate a dual-display in a variety of ways, depending on the application and the purpose. The different configurations for operating dual display surfaces may be mode-dependent.

Figure 8A:
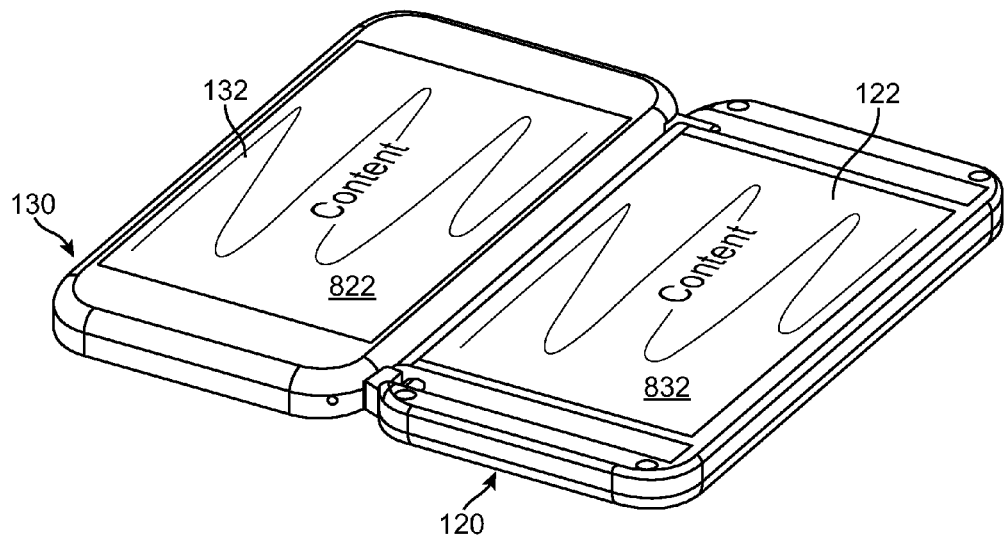
FIG. 8A illustrates an embodiment in which the display surfaces of a computing device are operated to separately display content that are portions of a common content, according to an embodiment.

In one embodiment, the two segments (e.g. first and second segments 130, 120 of FIG. 1A through FIG. 1C) are extended into the fully open position, so that the two display surfaces are substantially co-planar with one another. In this orientation, the processor 710 (or multiple processors) synchronize the display surfaces so that the two surfaces operate as one display surface with a mullion (housing structure) separating the two displays. FIG. 8A illustrates an embodiment in which display surfaces 132, 122 are synchronized to display content 832, 822 that corresponds to portions of the same content (and thus provide one combined display). As alternative or variations, the content 832, 822 may be provided by one application (e.g. different instances of the same application), or provided by different applications.

Figure 8B:
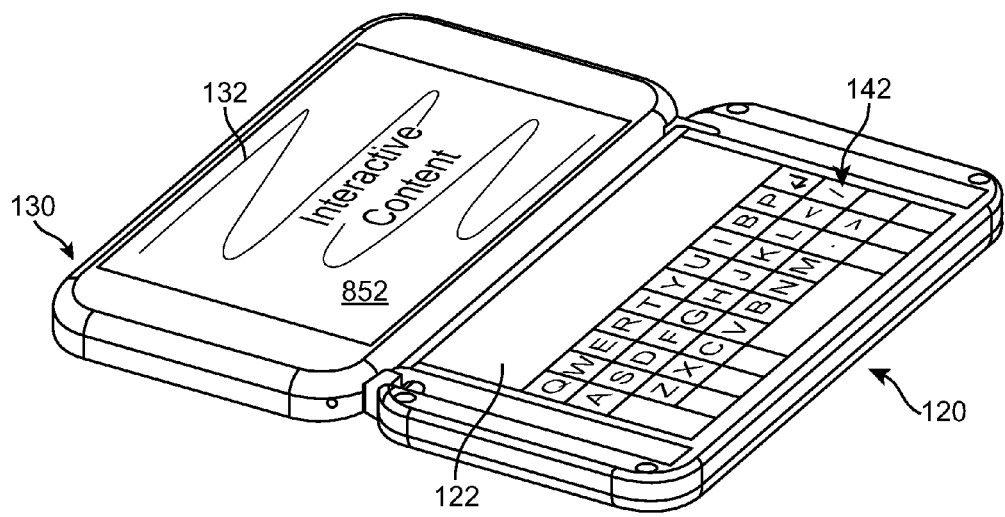
FIG. 8B illustrates an embodiment in which the display surfaces of a computing device are operated to separately display a virtual input mechanism and a corresponding interactive content, according to an embodiment.

FIG. 8B illustrate an embodiment in which the display surfaces 132, 122 can be operated in an alternative mode in which (i) the display surface 132 of one of the two segments (e.g. the display surface 122 of the bottom segment 120, shown in FIG. 1A through FIG. 1C) emulates a mechanical input mechanism (e.g. virtual keyboard 842, dialpad (not shown), scroll mechanism); and (ii) the display surface of the other of the two segments (e.g. display surface 132 of the top segment 130) displays interactive content 852 (e.g. application content, web page, document, video clip etc.). Thus, the user can interact with the device using input features provided through one display surface, while viewing content generated on another display surface.

Figure 8C:
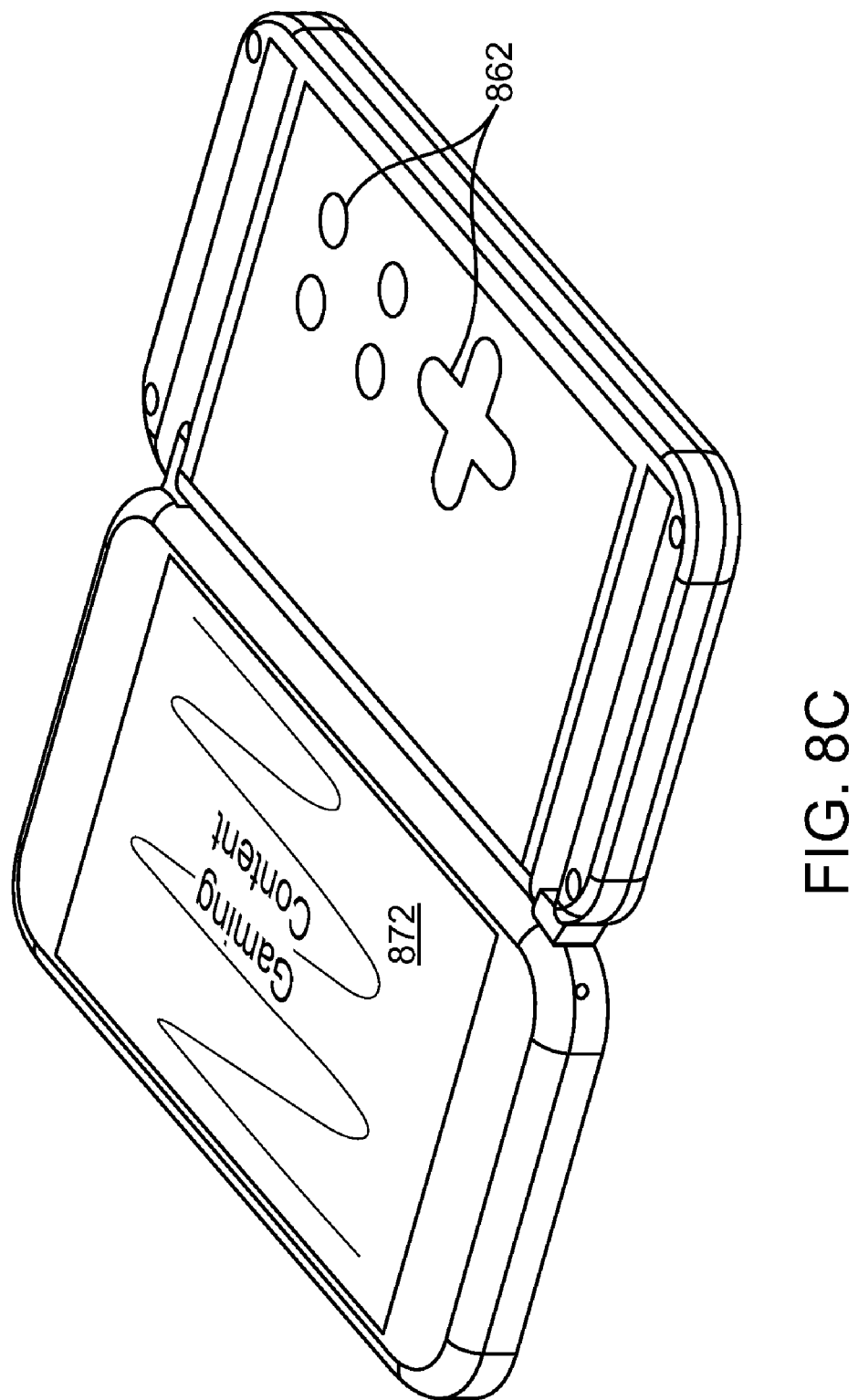
FIG. 8C illustrates an embodiment in which the display surfaces of a computing device are used to separately display gaming controls and gaming content, under an embodiment.

Numerous other variations are possible. FIG. 8C illustrates an embodiment in which one of the display surfaces (e.g. bottom surface 122) can provide virtual gaming controls 862, and the display surface 132 of the other segment 130 can be used to display gaming content 872 in an interactive manner.

Still further, the two display surfaces can display different content generated from the same application. For example, on a calendar application, one display surface can display a today view, while the other display surface displays the calendar entry for a particular day. As another example, in an email application, one display surface may show an opened email, while the other displays an inbox.

It is contemplated for embodiments described herein to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A mobile computing device comprising:
   a first segment;
   a second segment; and a coupling mechanism that enables the second segment to move relative to the first segment between a closed position, a partially open upright position, and a substantially open position, the coupling mechanism including:
- a slider block having a bottom rail integrated with a housing of the first segment;
- a support structure integrated with a housing of the second segment, the support structure being pivotally coupled to an arm; and
- a sled that is moveably coupled to the bottom rail and the arm, the sled being moveably coupled to the bottom rail to translate linearly along the bottom rail to enable the second segment to move between the closed position, the partially open upright position, and the substantially open position;

wherein: (i) when in the closed position, the second segment overlays the first segment, so that a display surface of only the second segment is accessible to a user; (ii) when in the partially open upright position, the second segment is positioned at an angle relative to the first segment and partially overlays the first segment, so that the display surface of the second segment and only a portion of a display surface of the first segment is accessible to the user; and (iii) when in the open position, the first segment and the second segment are positioned end-to-end, so that the display surface of each of the first segment and the second segment is completely exposed to the user;

wherein the second segment is moveably coupled to the first segment so that a path of motion of the second segment moving between each of the closed position, the partially open upright position, and the open position is substantially linear from a starting point at the closed position to a point where the second segment can be positioned at the angle relative to the first segment.

2. The mobile computing device of claim 1, wherein display surface of the first segment and the display surface of the second segment are of a substantially same size or area.

3. The mobile computing device of claim 1, further comprising:
- one or more processors that are structured to generate display content for each of the first display surface and the second display surface;
- one or more sensors that are positioned to detect an orientation of the mobile computing device;
- wherein the one or more processors are configured to orient the display content based on the detected orientation of the mobile computing device by the one or more sensors.

4. The mobile computing device of claim 3, wherein the one or more processors are configured to orient the display content in one of a portrait or landscape orientation.

5. The mobile computing device of claim 1, wherein the display surface of each of the first and second segment is touch-sensitive.

6. The mobile computing device of claim 1, further comprising a slider coupling mechanism that is structured to moveably couple the first segment and the second segment together in order to enable the second segment to slide between the closed position, the partially open upright position, and a substantially open position.

7. The mobile computing device of claim 1, wherein the first segment and the second segment have a same thickness.

8. The mobile computing device of claim 1, wherein the first segment and the second segment have a substantially same length, width and thickness.

9. The mobile computing device of claim 1, wherein the first segment and the second segment have a substantially same weight.

10. The mobile computing device of claim 1, wherein the arm is pivotally connected to the sled to pivot between a first position that is upright relative to a base of the slider block, and a second position that is co-linear with the base of the slider block.

11. The mobile computing device of claim 10 wherein the arm is pivotally connected to the support structure to enable the second segment to be held at an angle relative to the first segment.

12. The mobile computing device of claim 1, further comprising one or more processors to (i) emulate a mechanical input mechanism virtually on one of the first or second display surfaces, and (ii) generate content that the user can interact with using the emulated mechanical input mechanism on the other of the first or second display surfaces.

13. The mobile computing device of claim 12, wherein the emulated mechanical input mechanism is a keyboard or a gaming control.

14. The mobile computing device of claim 1, further comprising:
- one or more sensors to detect a position of the second segment being in the closed position, the partially open upright position, or the open position; and
- one or more processors coupled to the one or more sensors to operate the mobile computing device in different modes based on the position of the second segment.

* * * * *